July 18, 1944.  H. H. COLSON  2,353,651

MATERIAL HANDLING MECHANISM

Filed Sept. 27, 1940   3 Sheets-Sheet 1

INVENTOR.
Herman H. Colson
BY
S. Ernest Low
ATTORNEY.

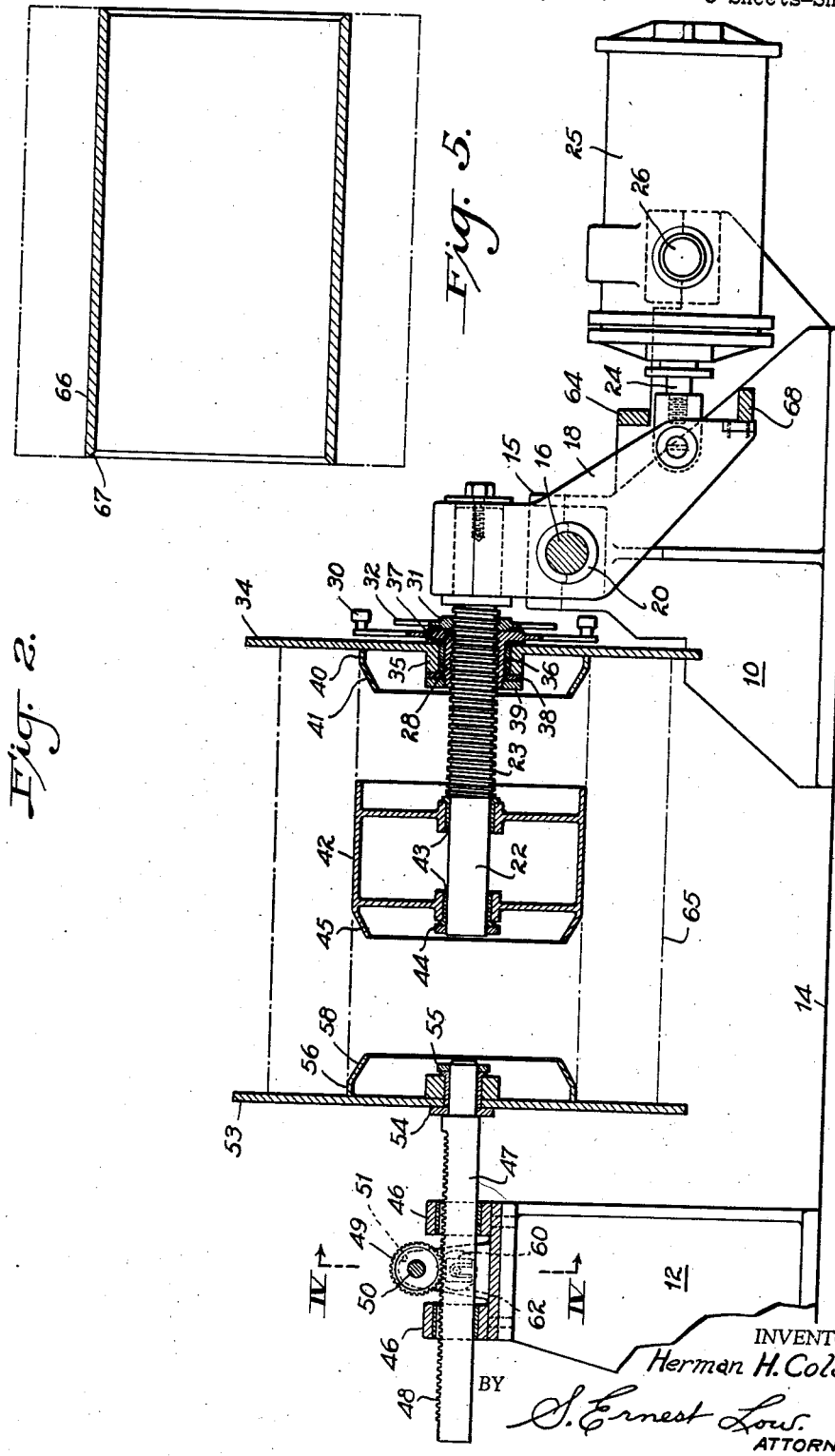

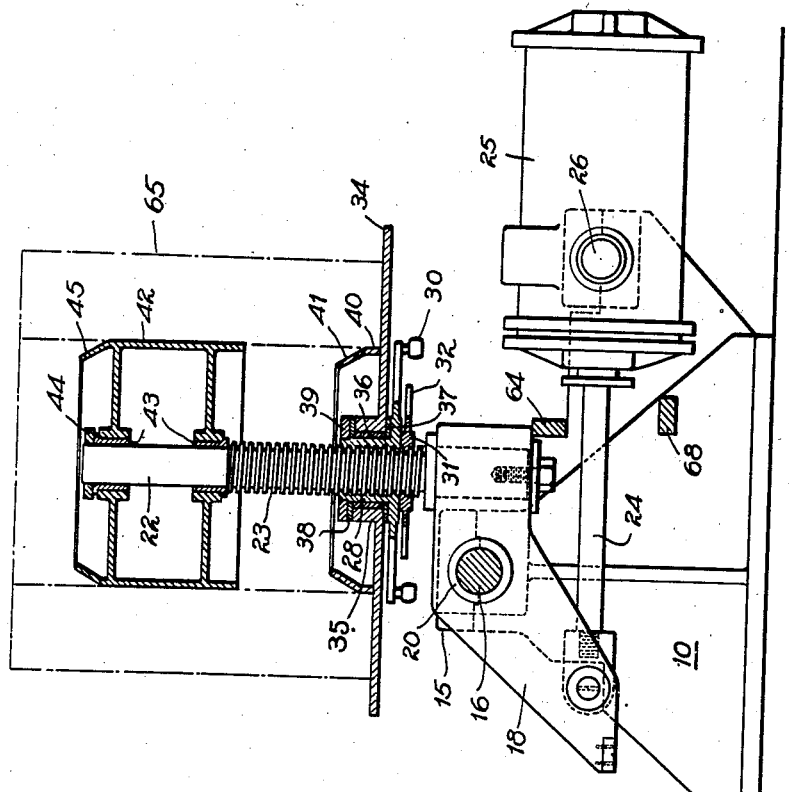
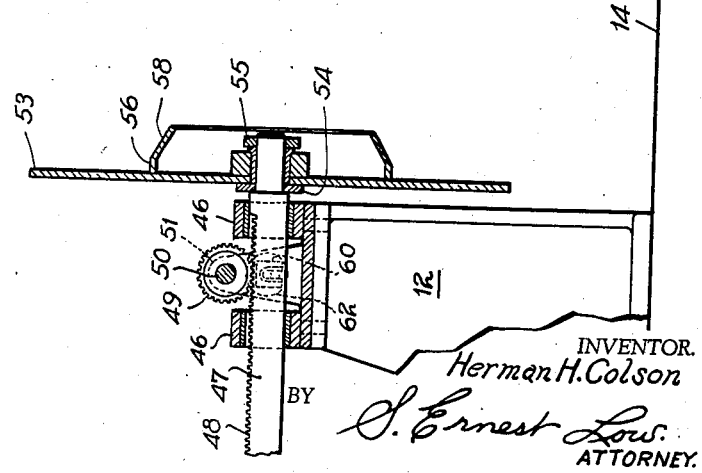
Fig. 3.

Patented July 18, 1944

2,353,651

UNITED STATES PATENT OFFICE 2,353,651

MATERIAL HANDLING MECHANISM

Herman H. Colson, Teaneck, N. J., assignor to Aluminum Company of America, Pittsburgh, Pa., a corporation of Pennsylvania Application September 27, 1940, Serial No. 358,655

10 Claims. (Cl. 242—78)

The present invention relates in general to mechanisms for handling material in web, strip, and coil form. It is more particularly directed to an improved auxiliary material handling or reeling mechanism adapted for association with a rolling mill, or other material processing mechanism, such as a slitter, draw press, or the like, wherein coils of material may be efficiently delivered from the improved auxiliary reeling mechanism to succeeding equipment with which the mechanism of the invention may be associated.

It is generally recognized that most manufacturing equipment employed at the present time in the manufacturing arts has undergone almost continuous development and improvement towards increasing its efficiency. Auxiliary material handling equipment employed in association with such manufacturing equipment has not, in all cases, experienced the same degree of improvement and development. For example, rolling mill speeds have increased severalfold in the past decade, whereas auxiliary material handling equipment, normally employed with rolling mills and the like, lags behind to the extent that it is not always possible to operate high speed rolling mills at the maximum speed and efficiency for which they were designed. The same remarks apply to numerous other types of manufacturing equipment, and on analysis it can usually be shown that the development of auxiliary material handling devices has not been on a parity with the manufacturing equipment with which they are intended to be employed.

The auxiliary equipment or mechanism forming the subject matter of the present invention, which will be hereinafter described in more detail, has been developed in conjunction with its adaptation and association with a rolling mill. However, it will be apparent to one skilled in the art, to which the present invention appertains, that the mechanism hereinafter described is in no way limited with respect to the manner in which it is capable of being employed.

Material in coiled form, as distinguished from flat strip or sheet, is the initial and end product in many manufacturing and fabricating arts. It will be apparent that coils of material are in many instances more desirable than flat strip, or lengths of web material, in that less floor space is required for any fabricating unit producing or operating upon the material. In the metal rolling art, for example, improved rolling technique and equipment have made it possible to produce thin gauge metal strip at excessive speeds, coilers and blocks of the collapsible type serving to catch and coil the material on the egress side of the rolling mill and present the same in coiled condition to a rolling mill for a subsequent reduction pass, or to any one of numerous other fabricating mechanisms. A difficulty, however, does present itself in the handling of coils of material which does not prevail in flat strip. In the art of rolling metal, as well as many other fabricating processes, it is a normal condition to have to provide for storage of coils of material. For example, metal normally requires annealing treatment intermediate reduction passes through rolling mills, under which circumstances the normal production of a rolling mill must be charged into a furnace or the like. Under those conditions it is preferable to stack coils of metal on end, as distinguished from stacking the coils in cylindrical surface contact with themselves or other supporting surface. End stacking obviously prevents surface marring of the material of the coils and lends stability to the stacking arrangement. However, end stacking may present undue difficulties if the individual coils of material are not substantially flat on their ends, as would be the case where the coils were unevenly wrapped through failure to guide and align adjacent wraps of material during a material coiling operation.

In general it is an object of the present invention to provide a material handling mechanism of such character that strip or web material of various widths may be efficiently received and delivered to an associated metal processing apparatus or mechanism.

A further object of the invention is to provide a device in the form of a reel which is capable of receiving and supporting preformed coils of material for subsequent delivery to succeeding material processing equipment or working steps in the fabrication of materials or articles.

Another object of the invention is to provide a mechanism, incorporating adjustable features of construction, which enable it to be capable of effective centering of coils of material of various widths, whereby material may be drawn from the coils in definite and predetermined alignment with an associated mechanism.

A further object of the invention is to provide a reeling mechanism capable of receiving and supporting an unsupported, or coreless, coil of material in condition for paying-off a continuous length of stock therefrom.

A more specific object of the invention is to provide a reel characterized by mechanical features of construction enabling it to receive and support a preformed coil of material in substantially vertical position, and thereafter tilt the coil to a substantially horizontal position in condition for withdrawal of the material from the coil in its latter position.

Other objects of the present invention will present themselves on consideration of the following description in which a particular embodiment of the invention has been selected for purposes of illustration. Reference is made in the description of the invention to the drawings accompanying this specification, in which:

Fig. 2 represents a front elevation, in partial section, of the mechanism illustrated in Fig. 1, the various elements of the device of the mechanism being disposed in cooperative horizontal coil supporting position;

Fig. 3 represents the mechanism illustrated in Fig. 2 with the various elements in coil loading position;

Fig. 5 represents a coil of material supported upon a tubular spool, the latter being illustrated in section.

Figure 1:
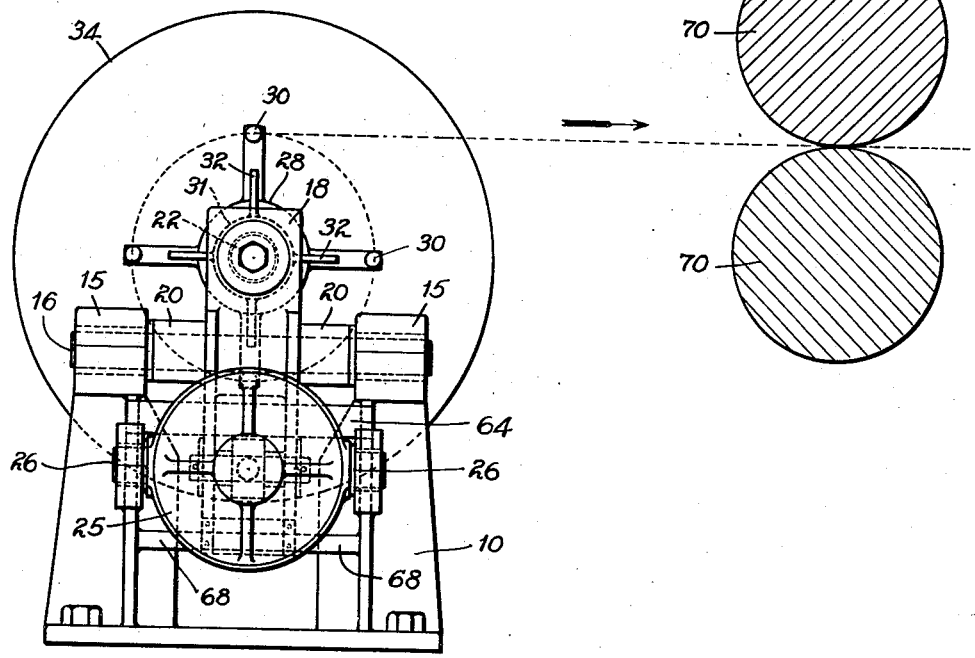
Fig. 1 represents an end elevation of an embodiment of the mechanism of the invention, as illustrated in association with a pair of rolling mill rolls (shown in section)

In the embodiment of the invention herein illustrated, there is provided a material handling device or apparatus in the form of a reel or coil supporting mechanism. The reel is broadly definable in terms of an adjustable and tiltable material receiving and supporting mechanism in which material, preferably a coil of strip or web material, may be charged or loaded on the reel in a substantially vertical position and thereafter oscillatably tilted into substantially horizontal position, where the material is firmly supported and guided in condition for rotational movement of the material with respect to suitable means for axially supporting the same.

On particular reference to the drawings it will be found that the embodiment of the invention illustrated therein preferably comprises a pair of pedestals or standards 10 and 12 which are normally secured to a suitable foundation or base 14. Pedestal 10 is provided with aligned bearings 15 in which a pivot shaft 16 is journalled. A bracket 18 is oscillatably mounted upon the pivot shaft 16 and is suitably centered thereon through the medium of spacers 20, which may take the form of integral hub portions of the bracket 18.

The bracket 18 is generally constructed in the form of a bell crank and serves to rigidly and non-rotatably support a shaft 22 in one leg thereof, the opposite leg of the lever 18 being suitably connected to a piston rod 24 secured to a piston within a double acting cylinder 25. The cylinder 25 is trunnion supported at 26 in the pedestal 10, which mounting permits oscillation of the cylinder about its trunnion support.

Shaft 22 is threaded intermediate its end at 23, the purpose of which will now be described. An interiorly threaded nut 28, provided with radially disposed manipulating handles 30, is mounted in threaded engagement with threads 23. Handles 30 make it possible to readily adjust the position of nut 28 relative to the threads 23. A jam or lock nut 31, also in threaded engagement with threads 23, is provided for locking the nut 28 in any desired position along the threaded portion of shaft 22. As in the case of nut 28, nut 31 is likewise equipped with manipulating handles 32.

A flange 34 is rotatably mounted upon the exterior cylindrical surface of nut 28. Flange 34 is preferably constructed in the form of a circular disk having an integral hub 35 which is provided with a suitable bronze or brass bushing 36 for free turning or rotational movement with respect to nut 28. End bearing washers 37 and 38 and a collar 39, secured as by set screws (not shown) to nut 28, serve to secure the flange 34 and its associated elements in proper assembled relationship. In its preferred form of construction, flange 34 is equipped with a coil supporting and pilot member in the form of a relatively short cylinder 40, suitably attached as by welding to the inner surface of the flange. The cylinder 40 preferably terminates in a tapered or frusto-conical pilot surface 41 at its end furthest removed from the flange 34.

Shaft 22 is preferably undercut below threads 23 adjacent its unsupported end furthest removed from bracket 18. Rotatably mounted on this undercut portion of the shaft is a cylindrical drum 42 of substantially the same diameter as the cylindrical surface 40, aforedescribed. Drum 42 is preferably provided with suitable bushings 43 and is secured against axial movement with respect to shaft 22 by means of collar 44 attached, as by set screws (not shown), to the extreme end of shaft 22. The drum 42 is also preferably provided with a pilot surface, in the form of a frusto-conical or tapered surface 45, adjacent the unsupported end of shaft 22.

Axially aligned bearings 46 are suitably mounted upon the upper surface of pedestal 12. These bearings 46 serve to support a shaft 47 in coaxial alignment with shaft 22, as viewed in Fig. 2. Shaft 47 is provided with rack teeth 48 along its upper surface, which are adapted to be engaged by a pinion 49 which is suitably keyed to a cross shaft 50 mounted in aligned bearings 51 disposed in a plane intermediate bearings 46 and at 90 degrees thereto. Shaft 50 is equipped with a hand wheel 52 for rotation of pinion 49, whereby shaft 47 may be reciprocated towards and away from the pedestal 10, or shaft 22.

Rotatably mounted upon the extreme end of shaft 47, between pedestals 10 and 12, is a flange 53, which, for all practical purposes, is the full equivalent of the flange 34. Flange 53 is rotatably supported on shaft 47 and is axially secured with respect thereto by means of washer 54 and collar 55, the latter being suitably secured to the shaft by set screws (not shown). Flange 53 is also provided with a coil supporting cylindrical surface 56 and contiguous pilot member in the form of a frusto-conical or tapered surface 58, as in the case of flange 34.

Figure 4:
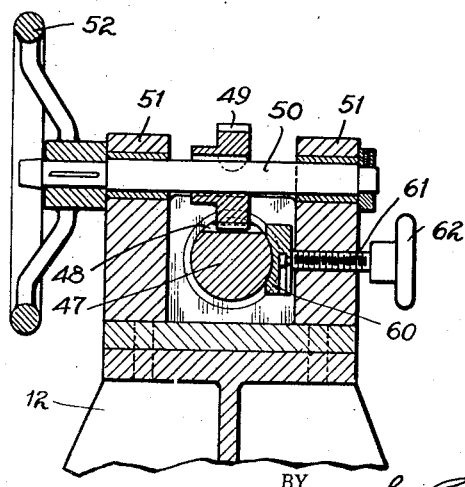
Fig. 4 represents a fragmentary sectional view, to an enlarged scale, taken along the line IV—IV of Fig. 2.

In order to insure proper relative and positive positioning of flange 53 with respect to any predetermined positioning of flange 34 along the threaded portion of shaft 22, shaft 47 is equipped with a locking mechanism. This locking mechanism comprises a brake block or shoe 60 (Fig. 4) provided with an arcuate surface disposed adjacent the cylindrical exterior surface of shaft 47. The shoe or block 60 is loosely supported on a clamping screw or bolt 61, which extends in threaded engagement through a support for one of the bearings 51. The screw 61 is equipped with a suitable hand wheel 62 which, on proper manipulation, serves to actuate block 60 into clamping relationship with shaft 47 to insure the same against relative movement with respect to its supporting pedestal 12.

In the preferred operation of the embodiment of the invention that has been previously described hereinabove, nut members 28 and 31 are manipulated in such manner as to position and lock flange 34 in desired location on the threaded portion 23 of shaft 22. The desired position of the flange is normally governed by the width of the material being handled and the alignment between the coil of material supported by the mechanism of this invention and the particular equipment to be supplied with material from a supported coil. Flange 53 is thereafter retracted to its extreme left hand position, as shown in Fig. 3, through proper manipulation of hand wheel 52 and its associated parts.

Through proper manipulation of fluid pressure to cylinder 25, piston rod 24 is projected to the left (Fig. 3) to oscillate bracket 18 in a clockwise direction. This operation of cylinder 25 also serves to oscillatably tilt the shaft 22, and the various elements carried thereby, in a clockwise direction, a stop bar 64 being provided on the pedestal 10 for engagement by the bracket 18 to preferably insure substantial vertical positioning of shaft 22. It will be manifest that shaft 22 may be oscillatably tilted into any other desired angular position with respect to its mounting. A preformed coil of material 65 may now be axially charged or loaded upon the flange 34. In this connection coil 65 may be entirely unsupported, or coreless, such as would be the case where a coil of material had been discharged from a collapsible reel. The mechanism of the invention, however, is not limited to unsupported or coreless coils and readily adapts itself to receiving and supporting coils of material that have been previously wound upon a tubular spool, such as indicated at 66 in Fig. 5. The spool 66 may be constructed from relatively thin tubing and is preferably interiorly beveled, as at 67, adjacent its ends.

In charging or loading a preformed coil of material upon the substantially horizontal surface (Fig. 3) presented by flange 34, it is to be noted that the frusto-conical surface 45 of drum 42 will act as a pilot to insure proper introduction of drum 42 into the interior of the coil. Likewise, frusto-conical pilot surface 41 will serve in this same capacity. This is particularly important in the case of unsupported, or coreless, coils of material in that such unsupported coils have a tendency to become elliptical, or otherwise bent and out of round, around their interior periphery. In the case of a coil of material supported upon a tubular spool, such as illustrated in Fig. 5, pilot surfaces 45 and 41 will cooperate with beveled surface 67 of tubular spool 66 and insure facile charging or loading of the mechanism of this invention.

Following the loading or charging of a coil of material upon the surface presented by flange 34 (Fig. 3), fluid pressure is thereafter introduced into cylinder 25 to retract piston rod 24 and oscillate bracket 18 in a counterclockwise direction, whereby the coil of material supported on flange 34 is oscillated to a substantially horizontal position. In this connection, a lower stop member or bar 63, incorporated in pedestal 10, serves to insure preferred horizontal positioning of shaft 22 and its associated elements carrying the coil 65. Hand wheel 52 is now rotated to enter pilot member 58 into the unsupported end of coil 65. This operation also serves to bring flange 53 into contact with the end of coil 65 in which position the coil is supported upon the cylindrical surface 56 forming an integral part of flange 53. In this latter position shaft 47 is locked, through the medium of brake shoe 60, against any movement of flange 53 out of supporting and lateral guiding relationship with respect to coil 65.

The mechanism is now in condition for withdrawing material from the coil 65 which may be accomplished in numerous ways, such as by the working rolls 70 of a rolling mill, or any suitable pair of pinch or feed rolls, which may be continuous or interrupted in their operation.

The freely rotatable flanges 34 and 53, together with their associated cylindrical material supporting surfaces 40 and 56, respectively, serve to positively support and guide the coil of material 65 adjacent its ends and edges, while the drum 42 positively supports the coil intermediate its ends. Material withdrawn from a coil so supported is therefore positively guided and axially supported at all times during withdrawal of material therefrom.

It will be manifest that the mechanism hereinabove described, as illustrative of this invention, is not necessarily limited in its use to the handling of preformed coils of material. It is further contemplated that the mechanism of this invention be employed in coiling strip or web material. In the latter case a continuous strip of material would be received and coiled upon the mechanism hereinabove described in the relative cooperative arrangement of the elements as shown in Fig. 2. Upon completion of a coiling operation it would only be necessary to reciprocate flange 53 out of engagement with the end of a coil and thereafter oscillatably tilt shaft 22 and its associated elements into substantially vertical position, where the coil of material could be removed from the mechanism. All of the advantages attributable to the mechanism when used for receiving and supporting a preformed coil of material would likewise obtain in its use in a coiling operation, since the freely rotatable flanges 34 and 53 would serve to properly align and guide adjacent wraps of material during a coiling operation, and the cylindrical surfaces 40, 42, and 56 would insure interior support as the coil built up. When employed as a coiler, a suitable belt blocker and drive, both of which are well known in the art, would be cooperatively associated with the mechanism of this invention.

It will be understood from consideration of the above description that the improved mechanism constituting the present invention is capable of receiving material in strip or coiled form, supporting the material in a manner which permits its rotational movement relative to its axial supporting means, and oscillatably tilting the material into a subsequent position angularly disposed with respect to its initial position. These characteristics of the mechanism of the present invention make it a universal and highly desirable mechanism in many of the fabricating arts, where efficient handling of material has long been a problem.

Although a specific mechanism has been resorted to herein for purposes of describing a detailed description of the invention, and means of practicing the same, it is to be understood that the invention is susceptible of a wide variety of embodiments and uses. Under the circumstances, then, the invention is not to be limited in any way except in so far as it has been defined in the appended claims.

What is claimed is:

1. A material handling mechanism comprising a pair of shaft members adapted to be oppositely disposed in axial alignment, a flange member rotatably mounted on each shaft member, means for adjustably positioning said flange members relative to each other, and means for oscillatably tilting one of the shaft members with respect to the other shaft member.

2. In a mechanism of the character described, means incorporating a flanged member for receiving and supporting a preformed coil of material in up-ended position with its major axis in a substantially vertical plane, means for oscillatably tilting said first-mentioned means into position to bring the major axis of the coil into a substantially horizontal plane, and means incorporating a second flanged member for engaging the opposite end of the coil in its horizontal position.

3. In a mechanism of the character described, a pair of pedestals, a shaft member supported in each pedestal, said shaft members being adapted to be disposed in axial alignment with each other, a flange member rotatably supported upon each shaft member, said flange members being translatable relative to each other, and means for imparting angular movement to one of the shaft members relative to the other shaft member.

4. A material handling mechanism comprising a pair of oppositely disposed rotatably mounted flanged members, cylindrical material supporting members integrally associated with said flanged members, means for adjusting the distance between said flanged members to accommodate material of various widths, and means for angularly tilting one of said flanged members with respect to the other flanged member.

5. A material handling mechanism comprising adjustable, spaced end supports for interiorly supporting a coil of material adjacent its ends, means for interiorly supporting the coil of material intermediate its ends, said end and intermediate supports being relatively rotatable with respect to one another, means for laterally removing one of said end supports, and means for oscillatably tilting the other end and intermediate support.

6. A material handling mechanism comprising adjustable, spaced end supports for interiorly supporting a coil of material adjacent its ends, means for interiorly supporting the coil of material intermediate its ends, said end supports and intermediate support being adapted to rotate independently of each other, and means for oscillatably tilting one end support and the intermediate support into and out of axial alignment with the other end support.

7. In a mechanism of the class described, end supports for a coil of material adapted to support said material for rotational movement about its central axis, separate intermediate supporting means coaxial with said end supports, and means for angularly tilting, in a vertical plane through the central axes of said end and intermediate supports, said intermediate and one end support simultaneously into and out of alignment with the other end support.

8. A web or strip material handling mechanism comprising a drum for supporting a coil of material, a flanged end support for said coil spaced axially of said drum, a common shaft for said drum and said end support, said end support being adjustable along said shaft with respect to said drum to accommodate various widths of material and mounted for rotation by said material, and means for simultaneously tilting said drum and end support in any stage of end support adjustment.

9. In a mechanism of the character described, a reel incorporating a pivotally mounted bell crank member, a shaft rigidly supported in one arm of the bell crank, a material supporting drum rotatably mounted on said shaft, a material engaging flange mounted on said shaft in spaced relation to said drum, means for adjusting said flange along said shaft relative to said drum, and means associated with the other arm of the bell crank for oscillating said shaft.

10. In a mechanism of the character described, a reel incorporating a pivotally mounted member, a shaft rigidly supported by said member, a material supporting drum rotatably mounted on one end of said shaft, said shaft having a threaded portion between said drum and the shaft supporting member, a nut member engaging the threaded portion of said shaft, means for locking said nut member against axial movement thereof, a material engaging flange rotatably mounted on said nut member, and means associated with the pivotally mounted member for oscillating said shaft.

HERMAN H. COLSON.